United States Patent
Veres et al.

(10) Patent No.: US 8,553,650 B2
(45) Date of Patent: Oct. 8, 2013

(54) METHODS AND DEVICES FOR CONTROLLING HANDOVER

(75) Inventors: András Veres, Budapest (HU); Zoltán Fehér, Budakeszi (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 34 days.

(21) Appl. No.: 13/321,291

(22) PCT Filed: Oct. 17, 2011

(86) PCT No.: PCT/SE2011/051241
§ 371 (c)(1),
(2), (4) Date: Nov. 18, 2011

(87) PCT Pub. No.: WO2012/166033
PCT Pub. Date: Dec. 6, 2012

(65) Prior Publication Data
US 2012/0307791 A1    Dec. 6, 2012

Related U.S. Application Data

(60) Provisional application No. 61/491,579, filed on May 31, 2011.

(51) Int. Cl.
*H04W 24/00* (2009.01)
*H04W 36/00* (2009.01)
*H04J 3/17* (2006.01)

(52) U.S. Cl.
USPC ........... 370/331; 370/329; 455/436; 455/437; 455/438

(58) Field of Classification Search
USPC .......... 370/328–334; 455/425, 436, 437, 438, 455/442
See application file for complete search history.

(56) References Cited

U.S. PATENT DOCUMENTS

| | | | |
|---|---|---|---|
| 8,442,533 B2 * | 5/2013 | Neubacher | 455/436 |
| 2008/0102835 A1 | 5/2008 | Zhao et al. | |
| 2009/0104909 A1 * | 4/2009 | Vesely et al. | 455/436 |
| 2010/0142486 A1 * | 6/2010 | Wahlqvist et al. | 370/332 |
| 2011/0086635 A1 | 4/2011 | Grob-Lipski | |
| 2012/0135739 A1 * | 5/2012 | Paterson | 455/436 |
| 2012/0238261 A1 * | 9/2012 | Mildh et al. | 455/425 |

FOREIGN PATENT DOCUMENTS

| | | |
|---|---|---|
| WO | 2008016944 A2 | 2/2008 |
| WO | 2009058069 A1 | 5/2009 |
| WO | 2010057331 A1 | 5/2010 |

OTHER PUBLICATIONS

Feher, Z., et al., "Movement Detection for Location Based Network Management", 2011 International Conference on Localization and GNSS (ICL-GNSS), Jun. 29-30, 2011, pp. 81-86.

* cited by examiner

*Primary Examiner* — Afsar M Qureshi
(74) *Attorney, Agent, or Firm* — Coats and Bennett PLLC

(57) ABSTRACT

Methods and devices in a cellular radio system for handling repeated handovers of a user equipment between a pair of cells is provided. It is determined if the user equipment is in one of two states, moving state or stationary state. Based on the determination different actions can be taken. For example threshold optimizations for reducing repeated handover may only be applied to a user equipment determined to be in a stationary state or a user equipment determined to be in a stationary state to can be nailed to the best cell of said pair of cells by not allowing the user equipment to handover to the other cell of said pair of cells.

16 Claims, 4 Drawing Sheets

METHODS AND DEVICES FOR CONTROLLING HANDOVER

TECHNICAL FIELD

The present invention relates to methods and devices for controlling repeated handover of user equipments between cells.

BACKGROUND

Ping-pong handover is a term that can be used to describe a scenario where a user equipment in a cellular radio network is changing back and forth between the same pair of cells for a number of times during a period of time. Ping-pong handover is also sometimes referred to as repeated handover. Ping-pong handovers are considered to be harmful in several ways. First, it causes unnecessary signaling load. Second, it affects the end-user experience significantly, since during handover, the data reception and transmission is halted, some amount of data may be lost, and the "recovery" after a handover may take considerable time especially if the mobile is using high data rate services. Delay sensitive applications can be also harmed significantly, e.g., real-time gaming.

In cellular radio systems handover is typically controlled by evaluating radio measurements performed by the user equipment. If the measurement from a new cell becomes better than the old one, the handover can be initiated. Since measurements fluctuate due to natural reasons, certain thresholds and smoothing are applied. The setting of these thresholds and smoothing parameters can be different and can be subject to optimization of different sorts.

Existing methods for addressing the ping-pong handover problem can typically be described as two steps:
  In the first step the ping-pong is detected by looking at historical handovers
  In the second step parameters including thresholds, penalty time etc. are adjusted.

The existing methods of solving a Ping-pong handover problem typically look at the observable statistics and try to reduce the number of ping-pongs. For example, in WO2009021711, a method involving transmission of system messages between the mobile radio stations and the base stations is described. The system messages for initiating the handover are used to transmit historical information relating to handovers which have already been performed. The information is used automatically to ascertain and set optimum operating parameters for the mobile radio stations or one of the base stations which are involved. In EP2073578, a priority level is assigned for each handover trigger cause. The coded causes are sub-divided into unrestricted handover class of highest priority and restricted handover class of high or normal priority. A Handover request is not issued if an identifier of the target base station is the same as the stored identifier and a penalty elapsed time is below configured value, when the trigger condition of an incoming handover belongs to a restricted class. In WO2009031108, a method is described involving handing over a user equipment from a first network access node to a second network access node and not considering the first network access node as a handover candidate from the second network access node for some period of time unless there is indicated a change in channel conditions that exceed a threshold in one or both of time and an amount of change. Also, in WO2009004405, a ping-pong handover avoiding method is described that involves deciding on allowing or preventing an intended handover based on the result of comparison between the decision criteria of the intended handover and the decision criteria of previous handovers of a mobile station to a base station.

However, as exemplified by the above methods, existing solutions also provides limitations on handover, which can prevent an optimal handover between cells. Thus, in existing solutions upon detecting a ping-pong handover, the handover decision becomes more and more conservative (as a result of an increase some thresholds). Consequently, the probability of failed handover or unprepared handover increases. This is a trade-off to which there exists no good solution. Hence, there is a need to provide methods and devices for reducing ping-pong handover that reduces or eliminates an increased risk of failed handover or unprepared handovers.

SUMMARY

It is an object of the present invention to provide an improved methods and devices to address the problems as outlined above.

This object and others are obtained by the methods and devices as set out in the appended claims.

As has been realized by the inventors in existing systems all ping-pong handovers (repeated handovers) are treated the same. In reality ping-pong handovers are not equal. Consequently, an improved handover can be obtained with increased knowledge of a particular ping-pong situation. Thus, as further realized by the inventors only reducing the ping-pong handovers (the number of times the user equipment moves back and forth between a pair of cells) is not the optimal solution to handle ping-pong handovers, since there are several reasons for ping-pong handovers. As a consequence not all ping-pong handovers should always be eliminated. For example Ping-pong handover can be desired when a user equipment is moving, passing buildings, trees and other obstacles. Due to movement the radio conditions change, and when thresholds change, causing handovers. Such handovers may advantageously be done repeatedly between the same base stations. In this case handovers are potentially necessary to avoid failed handovers, and the effect of a ping-pong handover is much less of a concern than if the user equipment is doing ping-pong handovers while being completely stationary. If the user equipment is stationary, there is no real need for handover; in this case the network can imply ping-pong restriction actions freely. For example, stationary user equipments can be nailed to the best cell (by adjusting thresholds for example).

In accordance with one embodiment a user equipment is first determined to be in one of two states that can be termed stationary or moving. Next, threshold optimizations are applied only to a stationary user equipment to obtain ping-pong handover elimination for the stationary user equipments. In particular only user equipments experiencing a ping-pong handover are determined to be either of the two states (stationary or moving).

In accordance with one embodiment ping-pong handover elimination can be supported for the moving user equipments as well. As identified above, it may be counterproductive to control individual user equipments by adding restrictions, since it may increase failed handovers. To reduce the ping-pong handover effect for moving user equipments cells are monitored for the amount of stationary and moving ping-pong handovers. If the ping-pong handover statistics for UEs determined to be in a moving state are high and exceed some threshold value (for example the number of ping-pong handovers for moving user equipments is high and above a threshold value in a cell or the ratio of moving/stationary user equipment is high and above a threshold value), it is an indication that the cell borders are set wrong. Typically, it may indicate that many user equipments move along follow the border between two cells. In this case individual user equipment threshold setting is not the best solution; instead, the cell settings are changed to change the border between cells. In accordance with one embodiment a SON (Self Optimizing Network) algorithm is applied in this case, which can much more effectively address this situation e.g., by changing tilt, power or other parameters. The actual threshold setting algorithm or network optimization SON algorithm can be chosen from any of the well-known methods. Threshold optimization SON algorithms are e.g., available as part of Optimi system called xParameter.

In accordance with one embodiment a method in a cellular radio system for handling repeated handovers of a user equipment between a pair of cells is provided. First it is determined if the user equipment is in one of at least two states, moving state or stationary state; and then threshold optimizations for reducing repeated handover are only applied to a user equipment determined to be in a stationary state or a user equipment determined to be in a stationary state is nailed to the best cell of said pair of cells by not allowing the user equipment to handover to the other cell of said pair of cells.

In accordance with one embodiment the best cell is determined based on measurements and or measurement reports.

In accordance with one embodiment the UE is determined to be in a stationary or moving state based on a UE reported timing difference from the pair of cells.

In accordance with one embodiment if a change in reported timing difference from the pair of cells is detected, the UE is set to moving state.

In accordance with one embodiment if no change in reported timing difference is detected for any pair of cells to which the UE is connected, the UE is set to stationary state.

In accordance with one embodiment the UE is determined to be in a stationary or moving state based on a UE reported Linear accelerator sensor signal or position signal.

In accordance with one embodiment if more than a predetermined number of UEs when determined to be in a moving state experience repeated handover between the same pair of cells a Self Optimizing Network procedure is initiated.

In accordance with one embodiment if the user equipment cannot be determined to be in any of the at least two states moving state or stationary state, the user equipment is determined to be in a third state, undecided state.

The invention also extends to a device or a node in a cellular radio system arranged to perform the above methods. The device or node can be provided with a controller/controller circuitry for performing the above methods. The controller(s) can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor may include, without limitation, digital signal processor (DSP) hardware, ASIC hardware, read only memory (ROM), random access memory (RAM), and/or other storage media.

BRIEF DESCRIPTION OF THE DRAWINGS

The present invention will now be described in more detail by way of non-limiting examples and with reference to the accompanying drawing, in which.

DETAILED DESCRIPTION

Figure 1:
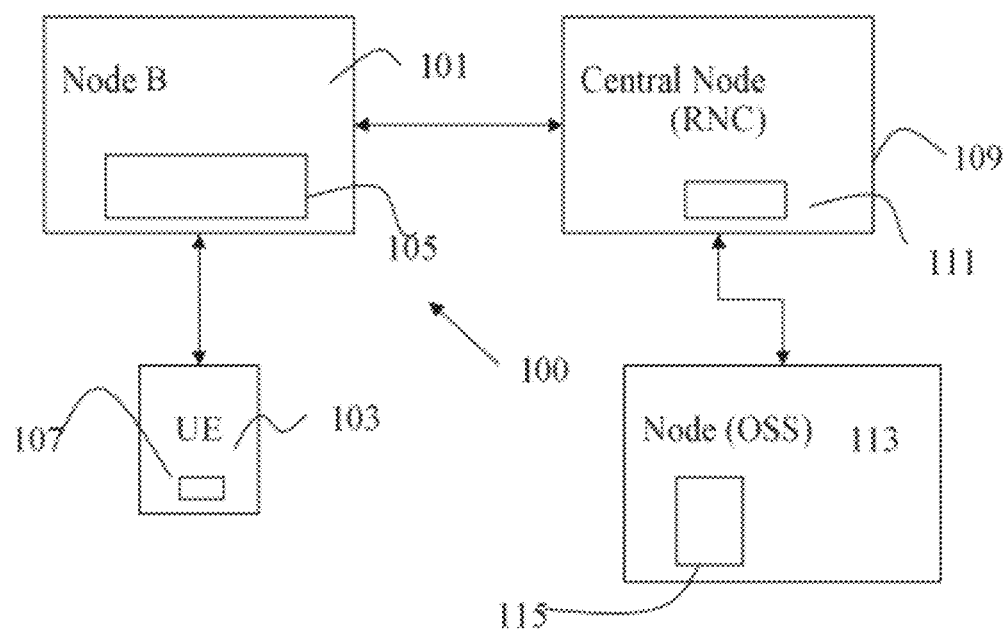
FIG. 1 is a view of a cellular radio system.

In FIG. 1 a general view of an exemplary cellular radio system 100 is depicted. The system 100 depicted in FIG. 1 is a UTRAN system. However it is also envisaged that the system can be another similar system, such as a GERAN or E-UTRA system. The system 100 comprises a number of base stations 101, whereof only one is shown for reasons of simplicity. The base station 101 can be connected to by user equipments in the figure represented by the UE 103 located in the area served by the base station 101. Further, the base stations 101 are controlled by a central node such as a Radio Network Controller (RNC) in the case of an UTRAN system. The base station, the central node and the user equipment further comprise controllers/controller circuitry 105, 107 and 111 for providing functionality associated with the respective entities. The controllers 105, 107 and 111 can for example comprise suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor may include, without limitation, digital signal processor (DSP) hardware, ASIC hardware, read only memory (ROM), random access memory (RAM), and/or other storage media. FIG. 1 also depicts a node 113 that can be used to collect information from central nodes 109 and to control the central nodes 109. The node 113 can for example be an Operational Support Systems (OSS). Node 113 comprises controller circuitry 115 configured to determine the state of a UE in the cellular radio system 100, i.e. controller circuitry configure to determine if a UE is moving or is stationary as will be described below.

Figure 2:
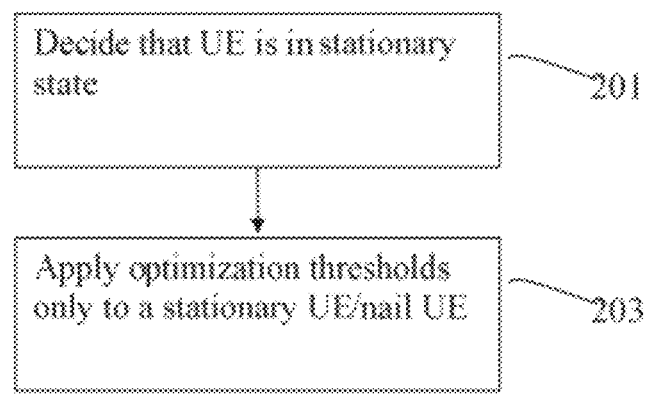
FIG. 2 is a flow chart depicting different steps performed when handling repeated handovers.

In accordance with one embodiment depicted in FIG. 2 a user equipment is determined to be stationary or not in a step 201. The determination if a user equipment is stationary or not can be made in a number of different ways. Typically, the location of the user equipment is determined and if the user equipment position is not changed by more than some predetermined value during some time the user equipment is determined to be stationary. Next, in a step 203, when it has been determined that the UE is in a stationary state threshold optimizations are applied only to a stationary user equipment to obtain ping-pong elimination for the stationary user equipments. The threshold optimizations can be made in accordance with any existing threshold optimization method used in existing systems for preventing ping pong handover effects and also by nailing the UE to a best cell as determined by some measure such a signal quality, a measurement report etc. These methods can comprise tuning of handover parameters for the UE, triggering cell setting changes to change the border between cells, or triggering a SON algorithm.

Figure 3:
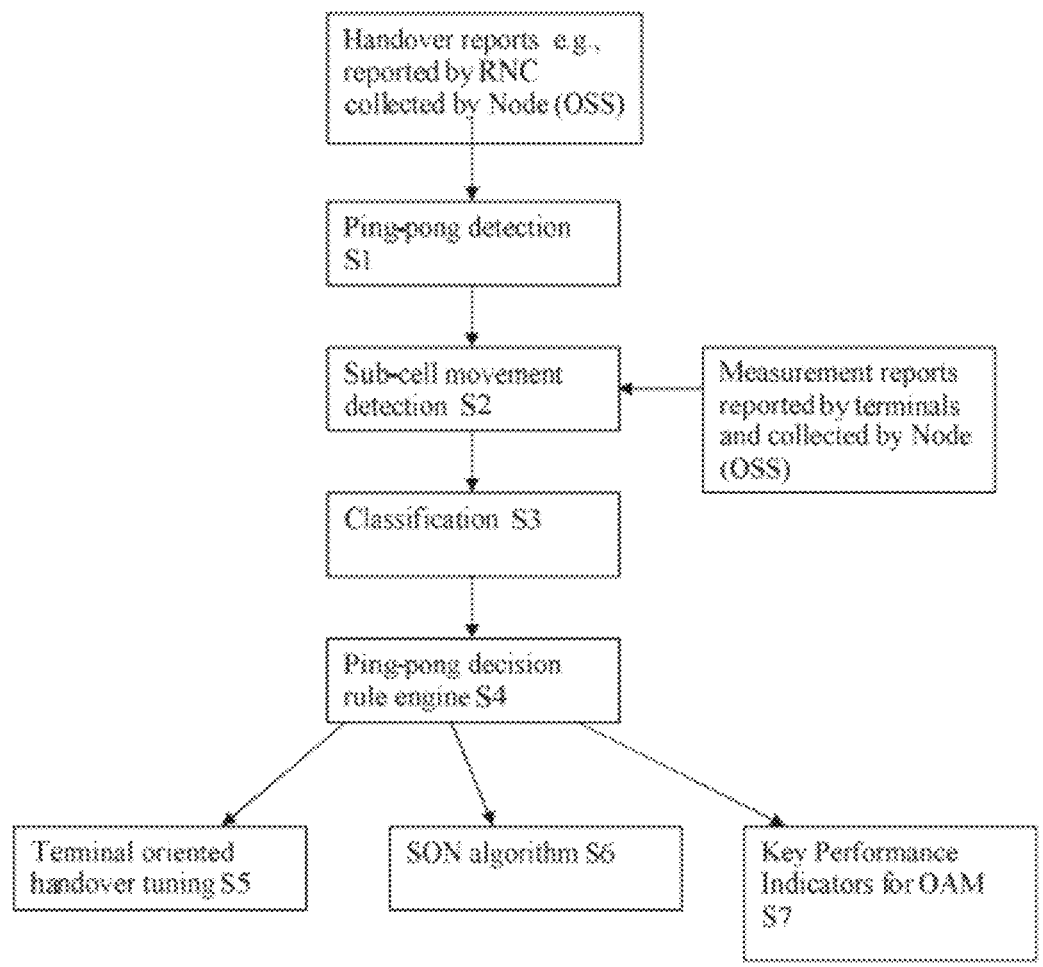
FIG. 3 is a view illustrating possible steps performed in some exemplary methods for handling repeated handovers.

In accordance with some embodiments a ping-pong handover method can comprise of the following steps, depicted in FIG. 3. The method can be executed using suitable software in a node of the system provided with a processor adapted to execute the software such as node 113 or it can be performed in a special dedicated device. In FIG. 1 controller circuitry 115 symbolizes both these options.

Thus, in FIG. 3 the following steps illustrated in response to collected handover reports. It is to be noted that not all of the steps need to be performed. Thus, different embodiment can be implemented by selecting one or many of the steps described below. The handover reports can for example be collected by a node such as an OSS node and received from an RNC. First in a step S1 a Ping-pong handover detection method is applied. Next in a step S2 a sub-cell movement detection method is used. This step can utilize Measurement reports reported by user equipments and collected by the Node. Next, in a step S3 classification of ping-ponging user equipments is performed. Then in a step S4 Ping-pong decision rule engine is rune to determine how to proceed. The outcome of the decision in can be one (or in some cases many) of the following:

In a step S5, tuning of handover parameters for the user equipment is performed. This can typically be performed by applying any suitable method for tuning handover parameters as described above.

In a step S6, invoke a SON algorithm of choice for the cells involved in the ping-pong handover.

In a step S7, Key Performance Indicators reporting on cell pairs suffering from stationary and moving ping-pong handovers are sent to operation, administration and maintenance (OAM) system—

The method is in these embodiments performed in between the measurements and actual ping-pong algorithms, and does an analysis of the measurements to decide what kind of reduction is actually optimal. The different steps will now be described in more detail as exemplary embodiments. It is to be noted that some steps and elements are optional and that some embodiments can comprise all or a subset of the below steps.

Ping Pong Detection Method (S1)

For ping-pong detection the handover history is used. The algorithm records a ping-pong instance as a short-sequence of CellA->CellB->CellA within time period D. Then, consecutive and overlapping short-sequences are concatenated, e.g. A->B->A and B->A->B where the last two cells are the same can be concatenated into a four cell sequence: A->B->A->B. As a result, a ping-pong handover event is created and passed to the Decision Rule Engine. The event can typically contain some or all of:
  Timestamp
  User equipment identity (e.g., IMSI)
  Total sequence duration
  Number of handovers in sequence
  Involved cell identities Sub-Cell Movement Detection Method (S2)

To assist in handover decisions, user equipments report measurements about neighboring cells to the network regularly. The reporting can be threshold triggered or periodic. In Wideband Code Division Multiple Access (WCDMA) networks, this report is called Radio Resource Control (RRC) measurement report and the receiving entity is the Radio Network Controller (RNC) node. In WCDMA mobile networks user equipment (UE) records the exact arrival of system frames (Radio Resource Control measurement reporting). UE observes and reports the time difference of neighboring cells (SFN—System Frame Number) and its own inner clock (CFN—Cell Frame Number) this is called SFN-CFN observed time difference. UEs reported the timing differences (Tm) of SFN and CFN for every cell in the monitored set.

$$TCFN - TSFNi = Tmi$$

In theory Tm values are constant in circular lines around NodeBs. Change of the Tm indicates that the distance of the UE and the NodeB is changing, the user equipment is moving. The resolution of the measurement is 1 chip in WCDMA networks, which equals approximately 78 meters. In practice Tm may also change due to imprecise clocks as a result stationary UE can also report Tm change. Low precision timing of the UE is eliminated if the signal of two different cells on different NodeBs is observed.

$$TCFN - TSFN1 = Tm1 \bmod 38400$$

$$TCFN - TSFN2 = Tm2 \bmod 38400$$

Calculating the difference (offset) of the two SFN-CFN measurement reports provides the elimination of UE clock.

$$Toffset = TSFN1 - TSFN2 = Tm1 - Tm2$$

With high probability the UE can also detect additional cells belonging to different NodeBs, enabling a refinement of the movement criteria, since we can calculate several Tioffset values for each pairs of cells.

Depending to which direction the UE is moving, the degree of change of Tioffset may differ. There may be cases when the path of the motion does not result in the change of Tioffset as equi-offset areas can be quite different. When a UE has multiple pairs of cells with associated NodeBs in sight, results can be classified into three possible cases:
a) Toffset change is detected for all of the evaluated pairs.
b) Toffset change is detected for some of the evaluated pairs.
c) No Toffset change is detected for any of the evaluated pairs.

Based on this knowledge, the movement detection method decides that:
(i) If any pair of NodeBs in sight detects change in the Toffset, user equipment is moving.
(ii) If none of the pairs of NodeBs in sight detects change in the Toffset, user equipment is stationary.

The above method is generally applicable if time-difference based measurements are available.

Figure 4:
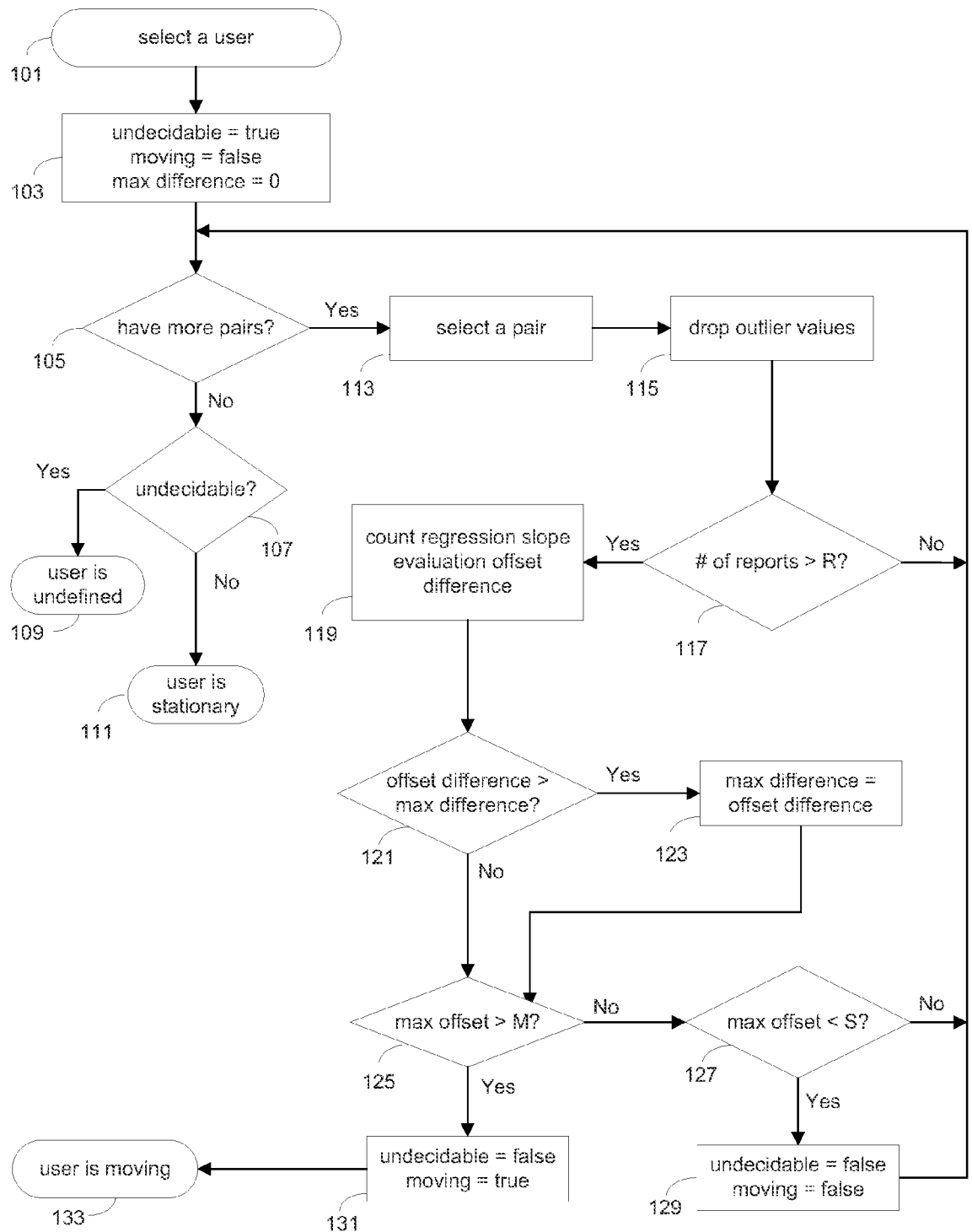
FIG. 4 is a flow chart illustrating an exemplary method for movement detection.

The ping-pong handover reduction method described above has the benefit that it works using standard information sources, but other methods for establishing movement detection can also be used if available, for example:
  GPS (Global Positioning System) or some other positioning signals reported back the system
  Linear accelerator sensor (usually available in smartphones such as Android and IPhone) signals reported back the system In FIG. 4 an exemplary detailed method for WCDMA systems is depicted. The algorithm assumes that for active user equipments it receives reports consisting of a UNIX timestamp, IMSI (International Mobile Subscriber Identity), Cell IDs and Tm values for every cell in the monitored set. As a first step data is grouped by IMSIs and time. A hash map structure is defined where different user equipments with their attributes are stored, and every user equipment is indexed with the IMSI. The movement detection algorithm steps through all the user equipments one by one. For each user equipment, every possible cell pair is analyzed, and a Toffset change is evaluated. Thus first, in a step 101 a user equipment is selected. Then, first every user equipment is set to an undefined (undecided) state, a parameter moving is set to false and a parameter of maximum difference is set to zero in a step 103. The User Equipments is set to remain in undecided state if none of its available pairs have at least a number R of reports after removing outliers (using a variance-based simple outlier detection method). Otherwise the change ci is calculated for each pair and the maximum is evaluated against the thresholds. The algorithm stops if all the user equipments have been analyzed. Thus, in a step 105, it is determined if there are more than one pair of cells involved in the ping pong handover. If the outcome in step 105 is no and it is not possible to determine in a step 107 if the user equipment is placed in an undefined state, step 109, and else the UE is determined to be in a stationary state in a step 111. If there are more than one pair in step 105 a pair is selected in a step 113. Next outlier values are dropped in a step 115. Then in a step 117 it is determined if the number of reports is more than said number R of reports. If not the method returns to step 105 else the method proceeds to a step 119. In step 119 a regression slope is counted and an offset difference is evaluated. Next, in a step 121 it is determined if the offset difference is more than the maximum difference. If the determination in step 121 is yes the maximum difference is set equal to the offset difference and the method then continues to a step 125, else the method continues directly to step 125. In step 125 it is determined if the maximum offset is above a value M. If yes the user equipment is determined to be moving in a step 131 and the state is set to moving in a step 133. If the maximum offset is not above the value M in step 125 the method continues to a step 127. In step 127 it is determined is the maximum offset is below a value S. If the maximum offset is not below the value S the method returns to step 105 else parameters indicating if the user equipment is in an undecidable or moving state are both set to false in a step 129 and the method returns to step 105.

Classification of Ping-Ponging User Equipments (S3)

The ping-pong handover detection method triggers events when a user equipment is in a ping-pong handover sequence. This information triggers the movement detection method. The movement detection method classifies user equipments depending on whether they are moving or stationary. This information is attached to the ping-pong event and passed on to the decision rule engine.

Ping-Pong Decision Rule Engine (S4)

The decision rule engine receives ping-pong events with movement classification information. This engine decides about the necessary actions to take. There can be several such rules and decisions inserted into the engine depending on further information:
   the policies of the operator,
   the service used by the customer,
   the customer group,
   user equipment type,
   location
   cell type (macro, micro, femto)
In some embodiments the following rules are used:
   If the user equipment is stationary, invoke a user equipment oriented threshold tuning algorithm
   If there are several stationary users, based on a percentage threshold for example, ping-ponging between the same cells, then a SON tuning algorithm is invoked
   If there are several moving users doing ping-pong handovers, based on a percentage threshold for example, then also a SON algorithm is invoked.

Tuning of Handover Parameters for the User Equipment (S5)

In networks handover thresholds are typically small to reduce the number of dropped calls. Most ping-pong handover reduction methods increase these thresholds, potentially harming the drop statistics. If the user is moving, the thresholds are not modified; rather, a cell tuning should be applied. On the other hand, if the user is stationary, it is safe to increase user thresholds. This sub-method is invoked if a stationary user is doing ping-pongs. In this step, any of a multitude of methods can be applied, for example any pre-existing method.

Invoke SON Algorithm for the Cells Involved in the Ping-Pong Handover (S6)

A SON method is invoked if there are many ping-pong handovers detected. The statistics are calculated as stationary or moving separately. The SON algorithm may change tilt, power or other parameters to reduce the number of such handovers. Knowledge of if a UE is stationary can improve the effectiveness of the SON algorithm. In some embodiments, if the ping-pong handovers are caused by moving users, then the cell borders are moved by adjusting tilt, power or other parameters. On the other hand, if ping-pongs are mostly due to stationary users, then user pinning or penalty time-based ping-pong reduction methods are also effective.

New Key Performance Indicators (S7)

A statistics of moving and stationary ping-pong ratios are calculated periodically and passed to the OAM system as Key Performance Indicators for cell-pairs. This can be visualized on the map, and can help in network operations and cell planning.

The format can look like the following:

| CellA → CellB | stationary ping-pong % | moving ping-pong % | Total samples |
|---|---|---|---|
| CellD → CellF | ... | | |
| ... | | | |

In a typical operational network, approximately 30-50% of all handovers are part of a ping-pong sequence. Among these, approximately 70% are stationary users, and 30% are moving. The geographical distribution differs greatly; some areas may show large number of stationary ping-pongs, others are suffering from many moving users. By knowing movement sub-cell level, the most optimal decision can be done about how to reduce the ping-pong. In networks handover thresholds are typically small to reduce the number of dropped calls. Most ping-pong reduction methods increase these thresholds, potentially harming the drop statistics. However, using the methods and devices as described herein, if the user is moving, the thresholds are typically not modified. Instead a cell tuning may be applied. On the other hand, if the user is stationary, it is safe to increase user thresholds.

The methods and devices herein can improve the handover procedure in a cellular radio system and will typically not add extra load on the network, require no new signaling and can be added to an existing network without major changes to the infrastructure.

The invention claimed is:

1. A method in a cellular radio system for handling repeated handovers of a user equipment (UE) between a pair of cells, the method comprising the steps of:
   determining if the UE is experiencing repeated handovers, and if so determining whether the UE is in a moving state or a stationary state; and
   responsive to determining the UE is in the stationary state, either applying threshold optimizations to the UE for reducing repeated handover of the UE, or constraining the UE to the best cell of said pair of cells by preventing handover of the UE to the other cell of said pair of cells.

2. The method of claim 1, wherein the best cell is determined based on measurements, measurement reports, or both.

3. The method of claim 1, wherein the UE is determined to be in the stationary or the moving state based on a UE-reported timing difference between the pair of cells.

4. The method of claim 3, wherein if a change in reported timing difference between the pair of cells is detected, the UE is determined to be in the moving state.

5. The method of claim 4, wherein if no change in reported timing difference is detected between any pair of cells to which the UE is connected, the UE is determined to be in the stationary state.

6. The method of claim 1, wherein the UE is determined to be in the stationary state or the moving state based on a UE-reported acceleration sensor signal or a UE-reported position signal.

7. The method of claim 1, wherein if more than a predetermined number of UEs in the moving state experience repeated handover between the same pair of cells, a Self-Optimizing Network procedure is initiated.

8. The method of claim 1, wherein if the UE cannot be determined to be in the moving state or the stationary state, the UE is determined to be in a third, undecided state.

9. A device for a cellular radio system adapted to handle repeated handovers of a user equipment (UE) between a pair of cells, the device comprising processor circuitry configured to:
   determine if the UE is experiencing repeated handovers, and, if so, determine whether the UE is in a moving state or a stationary state; and
   responsive to the UE being in the stationary state, to apply threshold optimizations to the UE for reducing repeated handover of the UE, or to constrain the UE to the best cell of said pair of cells by preventing handover of the UE to handover to the other cell of said pair of cells.

10. The device of claim 9, wherein the controller circuitry is further configured to determine the best cell based on measurements, measurement reports, or both.

11. The device of claim 9, wherein the controller circuitry is further configured to determine that the UE is in the stationary state or the moving state based on a UE-reported timing difference between the pair of cells.

12. The device of claim 11, wherein the controller circuitry is further configured to determine that the UE is in the moving state if a change in reported timing difference between the pair of cells is detected.

13. The device of claim 12, wherein the controller circuitry is further configured to determine that the UE is in the stationary state if no change in reported timing difference is detected between any pair of cells to which the UE is connected.

14. The device of claim 9, wherein the controller circuitry is further configured to determine that the UE is in the stationary state or the moving state based on a UE-reported acceleration sensor signal or a UE-reported position signal.

15. The device of claim 9, wherein the controller circuitry is further configured to initiate a Self-Optimizing Network procedure if more than a predetermined number of UEs, when determined to be in the moving state, experience repeated handovers between the same pair of cells.

16. The device of claim 9, wherein the controller circuitry is further configured to determine that the UE is in a third, undecided state, if the UE is not determined to be in either the moving state or the stationary state.

* * * * *